T. C. LUCE.
HOOK FOR SWINGS, HAMMOCKS, &c.
APPLICATION FILED JULY 7, 1915.
1,176,714.
Patented Mar. 21, 1916.
Fig. 1.
Fig. 2.
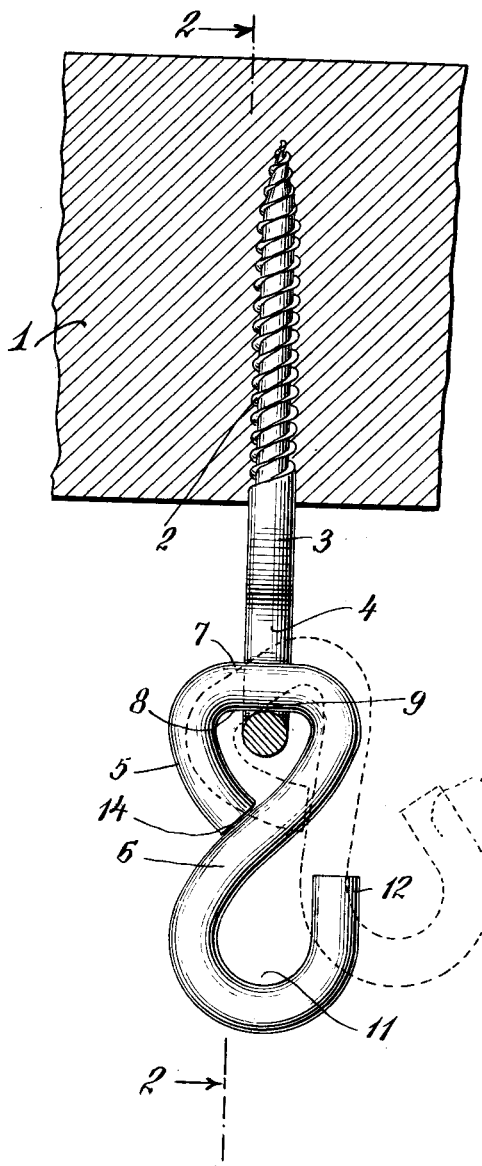
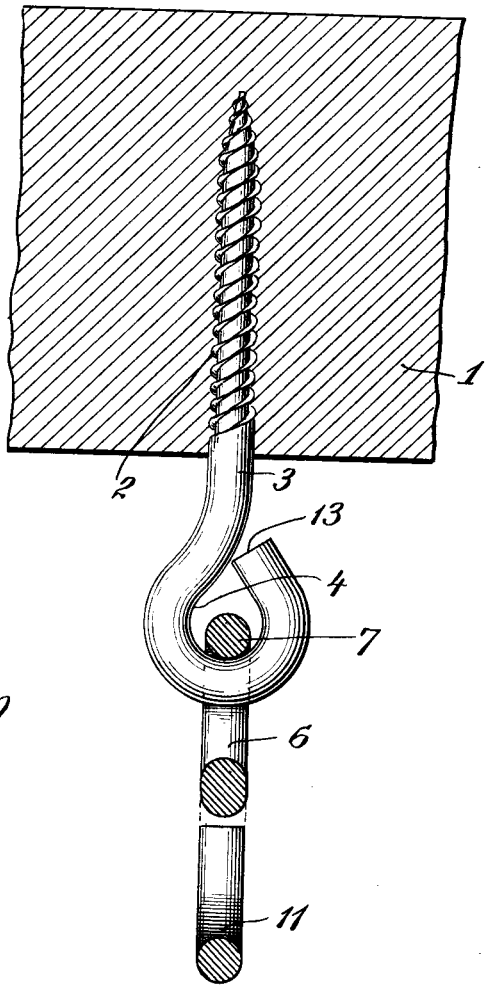
WITNESSES
Jessie B. Kay
Charles Eberhart
INVENTOR
Thomas C Luce
BY
Harry L. Ulman
ATTORNEY
THE COLUMBIA PLANOGRAPH CO., WASHINGTON, D. C.

UNITED STATES PATENT OFFICE.

THOMAS C. LUCE, OF STRATFORD, CONNECTICUT, ASSIGNOR TO AMERICAN CHAIN COMPANY, INCORPORATED, OF BRIDGEPORT, CONNECTICUT, A CORPORATION OF NEW YORK.

HOOK FOR SWINGS, HAMMOCKS, &c.

1,176,714. Specification of Letters Patent. Patented Mar. 21, 1916.

Application filed July 7, 1915. Serial No. 38,606.

*To all whom it may concern:*

Be it known that I, THOMAS C. LUCE, of Stratford, county of Fairfield, State of Connecticut, have made a certain new and useful Invention Relating to Hooks for Swings, Hammocks, &c., of which the following is a specification, taken in connection with the accompanying drawing, which forms part of the same.

This invention relates especially to hooks or suspending members for swings, hammocks or other swinging loads, the hook or other swinging member being formed with a wide loop so as to provide a bearing socket having a wide bearing surface or member substantially perpendicular to the direction of load and extending substantially in the plane in which the swinging movement takes place so that rocking or rolling movement occurs between this bearing surface and the coöperating pintle member and sliding or squeaking is correspondingly minimized.

In the accompanying drawing showing in a somewhat diagrammatic way an illustrative embodiment of this invention Figure 1 is a sectional elevation; and Fig. 2 is another sectional elevation thereof taken substantially at right angles on the line 2—2 of Fig. 1.

The suspending member may be of any suitable form and material and be of such shape as to conveniently secure the load thereto and to provide a substantially rigid wide loop so that the bearing socket thus formed has a wide bearing surface which is substantially perpendicular to the direction of load on this suspending member or substantially in the form of a circular arc drawn about the point at which the load is applied as a center. If desired, the suspending member may be in the form of a substantially rigid hook 6 which may be conveniently formed of round steel or other stock and provided with the bend 11 to receive the load and with the point 12 to form a standard hook. The suspending member may be formed with a wide bearing socket having the wide bearing surface or member 8 arranged substantially in the form of a circular arc drawn about the point at which the load is applied to this rigid suspending member, that is about the inner bend 11 of the hook in this instance. This bearing member is also substantially perpendicular to the direction of load and of ample width in the plane in which the swinging movement of the suspending member occurs so that this member can roll or rock about the coöperating pintle member throughout the extent to which it moves under normal conditions. The suspending member may be provided with a substantially closed loop by forcing the portion 5 of the suspending hook down toward its shank so that its end 14 comes into substantial contact with the shank to prevent its disengagement with the pintle member. It is also desirable to have the lower or hook portion of the suspending member in substantially the same plane as the loop thereof which gives a more symmetrical and stronger construction.

Any suitable form of coöperating pintle member may be used in connection with this suspending member, there preferably being a substantially circular pintle member coöperating with the bearing socket or bearing surface of the loop, this pintle member being also preferably arranged so that its bearing portion is substantially perpendicular to the direction of load and to the plane of the loop for best results. If desired the pintle member may be formed on a suitable supporting member or bolt 3 which may have a threaded portion 2 so as to engage the beam or other support 1 from which the swing, hammock or other load is to be suspended. The eye 4 may be formed in this supporting member and may, if desired, be substantially closed by having its end 13 forced substantially into contact with the shank of the supporting member so as to prevent disengagement of the parts, it also being advantageous in many instances to have the entire portion of this eye with which the bearing socket coöperates given a substantially circular or curved form which facilitates the alinement of these parts. It is thus apparent that when the supporting member is forced into place so that the portion of its eye which constitutes the pintle member is substantially perpendicular to the plane of the suspending member and to the plane of its swinging movement, this suspending member has substantially pure rocking or rolling movement on its pintle, the point of contact thus shifting somewhat along the hook's wide bearing surface which always remain substantially perpendicular to the direction of load. This is indicated by the dotted position of the hook or suspending member in Fig. 1 showing the position of the parts as the hook is swung under operating conditions from its full line position, and a similar angular displacement in the opposite direction will of course transfer the point of contact in the other direction along the bearing surface or member within the loop. The parts are furthermore self-adjusting since if the hook was originally arranged so that the pintle member was close to one end of the bearing socket 8, the first swing which occurred would cause the pintle member to engage that end of the bearing of the socket and the bearing socket would then slip over the pintle member sufficiently so that the subsequent swinging of the hook would take place with a substantially pure rolling movement and without objectionable slipping or squeaking of the parts so long as the supporting member has its eye turned in the proper direction in the first place.

This invention has been described in connection with a number of illustrative embodiments, forms, materials, arrangements, proportions and numbers of parts, to the details of which disclosure the invention is not of course to be limited, since

What is claimed as new and what is desired to be secured by Letters Patent is set forth in the appended claims.

1. The two-piece suspending device for swings, hammocks, and so forth, comprising a hook suspending member formed of substantially round stock and having a bent hook portion to carry the load and having a wide loop to form a bearing socket having a wide bearing member substantially in the form of a circular arc having the loading point of the hook portion as a center and a permanently connected screw supporting member formed of substantially round stock and having an eye loosely inclosing said loop and promoting its angular alinement to form a substantially circular sectioned pintle portion engaging said bearing member and adapted to be arranged substantially perpendicular to the direction of load of said suspending member and its plane of swinging movement to allow said suspending member to have rolling contact during its swinging movement without undesirable slipping or squeaking.

2. The two-piece suspending device for swings, hammocks, and so forth, comprising a hook suspending member having a bent hook portion to carry the load and having a wide loop to form a bearing socket provided with a wide bearing member substantially perpendicular to the direction of load and a permanently connected supporting member having an eye loosely inclosing said loop and promoting its angular alinement and having a pintle portion which is substantially circular sectioned through the part engaging said bearing member and adapted to be arranged substantially perpendicular to the direction of load of said suspending member and its plane of swinging movement to allow said suspended member to have rolling contact during its swinging movement without undesirable slipping or squeaking.

THOMAS C. LUCE.

Witnesses:
GEORGE COLLISON,
C. G. WILLIAMS.

Copies of this patent may be obtained for five cents each, by addressing the "Commissioner of Patents, Washington, D. C."